(12) United States Patent
Vella

(10) Patent No.: US 6,709,409 B2
(45) Date of Patent: Mar. 23, 2004

(54) COLLECTION DEVICE

(75) Inventor: Daira Valda Vella, Kerrie (AU)

(73) Assignee: Bewer Pty Ltd of Wingrove Park, Kerria (AU)

( * ) Notice: Subject to any disclaimer, the term of this patent is extended or adjusted under 35 U.S.C. 154(b) by 159 days.

(21) Appl. No.: 09/915,888

(22) Filed: Jul. 26, 2001

(65) Prior Publication Data

US 2002/0091363 A1 Jul. 11, 2002

Related U.S. Application Data

(60) Provisional application No. 60/251,177, filed on Dec. 4, 2000.

(30) Foreign Application Priority Data

Oct. 3, 2000 (AU) .............................................. PR0514

(51) Int. Cl.[7] .............................. A61B 5/00; B65D 81/00
(52) U.S. Cl. ....................................................... 600/573
(58) Field of Search ................................. 600/573, 576; 422/58, 101, 102, 61; 436/808

(56) References Cited

U.S. PATENT DOCUMENTS 5,352,410 A * 10/1994 Hansen et al. ................ 422/58

* cited by examiner

Primary Examiner—Max F. Hindenburg
Assistant Examiner—Brian Szmal
(74) Attorney, Agent, or Firm—John A. Artz; Artz & Artz, P.C.

(57) ABSTRACT

A collection device (100) suitable for use in collecting urine from animals, the device (100) including a collection tube component (300) for collecting urine from an animal and a main chamber component (200) for storing urine collected with the collection tube component (300). Engagement means (342) for operatively connecting the collection tube component (300) and the main chamber component (200) are provided so that the collection tube component (300) and the main chamber component (200) are both releasably engagable. In use, the collection device (100) is positioned to collect urine from an animal, and the engagement means (342) is able to operatively connect the main chamber component (200) and the collection tube component (300) for allowing urine to pass from the collection tube component (300) to the main chamber component (200).

32 Claims, 3 Drawing Sheets

COLLECTION DEVICE

This application claims the benefit of Provisional application No. 60/251,177 filed Dec. 4, 2000.

FIELD OF THE INVENTION

The invention relates to collection devices and relates particularly, though not exclusively, to collection devices suitable for collecting urine from animals especially female animals such as mares, cows, camels and the like.

BACKGROUND OF THE INVENTION

The collection of urine from pregnant mares is a substantial industry. The urine of pregnant mares returns a relatively high content of conjugated oestrogens, which can be used for pharmaceutical preparations such as, for example, hormone replacement pharmaceutical in humans, or hormone growth stimulants in other animals.

At present, one existing method of collecting urine from pregnant mares involves the use of a catcher generally of the type described in international patent application PCT/AU94/00709 entitled "Equidae manure/urine catcher" (published as WO95/13695). This type of device is commonly referred to as a horse nappy or diaper, as it collects urine and manure from the mare in a pouch which generally conforms to the underbelly of the mare.

Collection devices of this type suffer various disadvantages. In particular, as the diaper collects urine and faeces, the diaper can become quite heavy for the mare to carry. This can be relatively cumbersome for the mare, and can result in discomfort.

It is an object of the invention to at least attempt to address these and other limitations of the prior art.

SUMMARY OF THE INVENTION

The inventive concept resides in a recognition that urine is advantageously collected from an animal using a collection device that facilitates convenient collection of the urine in a storage chamber supplied, via a tubular passage, with urine from the animal. Preferably, a collection device in accordance with this concept desirably avoids wastage of collected urine, and allows the storage chamber to be replaced and cleaned with ease. Preferably, the storage chamber is suitable for storing urine after collection.

Accordingly, the invention provides a collection device suitable for use in collecting urine from animals, the device including:
- a collection tube component for collecting urine from an animal;
- a main chamber component for storing urine collected with the collection tube component; and
- engagement means for operatively connecting said collection tube component and said main chamber component so that said collection tube component and said main chamber component are both releasably engagable;
- wherein, in use, the collection device is positioned to collect urine from an animal, and the engagement means is able to operatively connect the main chamber component and the collection tube component for allowing urine to pass from the collection tube component to the main chamber component.

Preferably, the engagement means includes corresponding engagable (for example, screw-threaded or self-locking) portions respectively disposed on the main chamber component and the collection tube component for connecting these components.

Preferably, disposed adjacent the engagable portion of the engagement means is a one-way valve which ensures that most of the urine that enters the main chamber component is unable to exit the main chamber component through the one-way valve.

Preferably, the main chamber component includes one or more attachment means by which the main chamber component can be suspended from the animal by means of an external support means. Preferably, support means in the form of support straps are threaded through the attachment means in the form of longitudinal slots formed within one or more flanges projecting from the main chamber component to suitably suspend the main chamber component under the belly of the mare. Preferably, the attachment means includes two flanges projecting from the main chamber component along a major dimension of the main chamber component, and longitudinal slots extending at least partly along these flanges, to allow support straps to be passed through these slots.

Preferably, the length of the longitudinal slots is greater than the width of the straps by which the chamber is suspended, to allow the position of the main chamber component to be adjusted as required. This may be required as the main chamber component progressively fills with urine, and the distribution of the weight of the main chamber correspondingly varies, to avoid unnecessary discomfort to the animal.

Preferably, the main chamber component is of a generally longitudinal shape having a major dimension. Preferably, the main chamber component is slightly tapered in its major dimension.

Preferably, the main chamber component is substantially fabricated from a material which is sufficiently robust to be generally suitable for regular handling, for example, PVC, silicon or gum rubber. Preferably, the main chamber component can be sealed while the urine is still stored within the main chamber component, for subsequent transport of the urine while it remains in the main chamber component. Preferably, the capacity of the main chamber component is greater than the maximum likely volume of daily urine output of the animal with which the collection device is intended to be used. Preferably, once the capacity of the main chamber component is exhausted, further urine is shed using a overflow mechanism on the main chamber component or preferably on the tube collection component.

Preferably, the main chamber component includes an exit valve through which urine can be drained from the collection device, once it has been collected in the main chamber. Preferably, the exit valve can be operated by hand to release urine stored in the main chamber component. Preferably, the exit valve is also snap engagable by an evacuation device which is able to remove urine from the main chamber component using suction pressure.

Preferably, the main chamber component includes an access aperture though which manual access can be gained to the inner surfaces of the main chamber. It is intended that the access aperture can preferably be used to visually inspect the interior of the main chamber component and, if required, clean the inner surfaces of the main chamber component. Preferably, the access aperture is relatively large, and can be covered with a removable cover member.

Preferably, the collection device disclosed herein is intended to be used in conjunction with an apparatus of the type which is able to separate urine from faeces produced by a mare or other animal.

The invention also provides a method of using the inventive collection device described above. In particular, the invention provides a method of using a collection device having a main chamber component which is interengagable with a collection tube component, the method including:

fitting the collection device to an animal from which urine is to be collected using the collection device;

disengaging the main chamber component from the collection tube component when urine has been collected in the main chamber component, and removing the main chamber component from the animal; and engaging a replacement main chamber component with the collection tube component for subsequent collection of urine from the animal.

BRIEF DESCRIPTION OF DRAWINGS

The invention will now be described by way of example, with reference to the accompanying drawings, in which.

DESCRIPTION OF PREFERRED EMBODIMENTS

Figure 1:
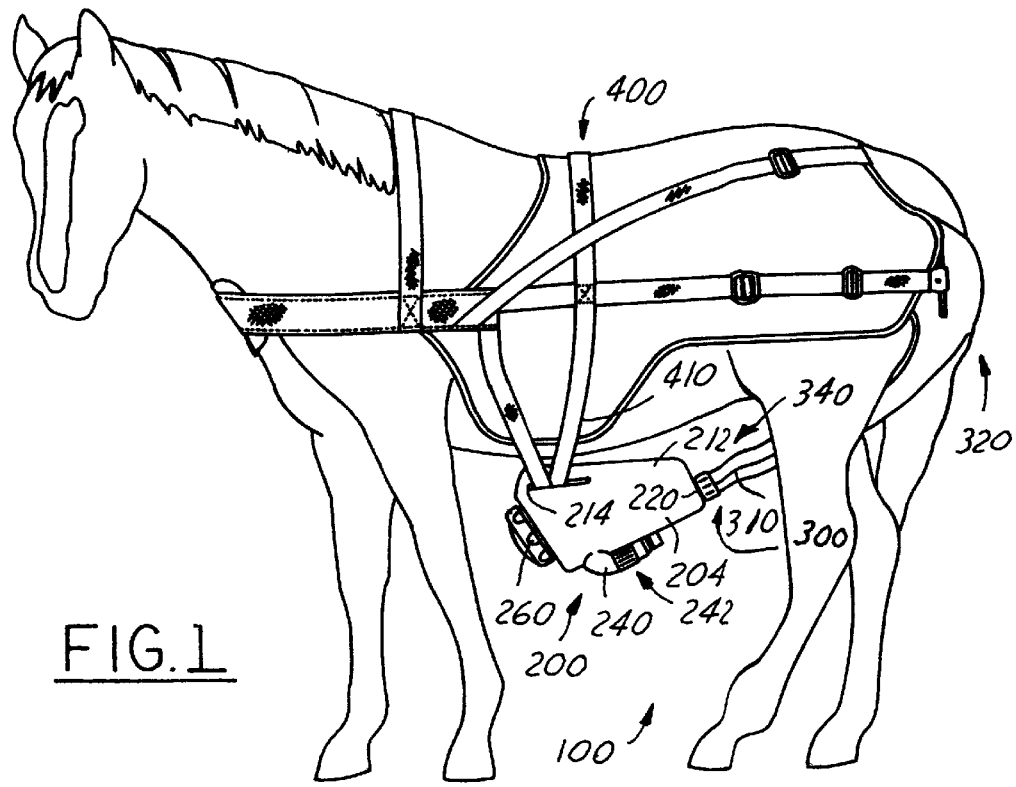
FIG. 1 is a drawing representing a mare fitted with a collection device constructed in accordance with an embodiment of the present invention.
Figure 2:
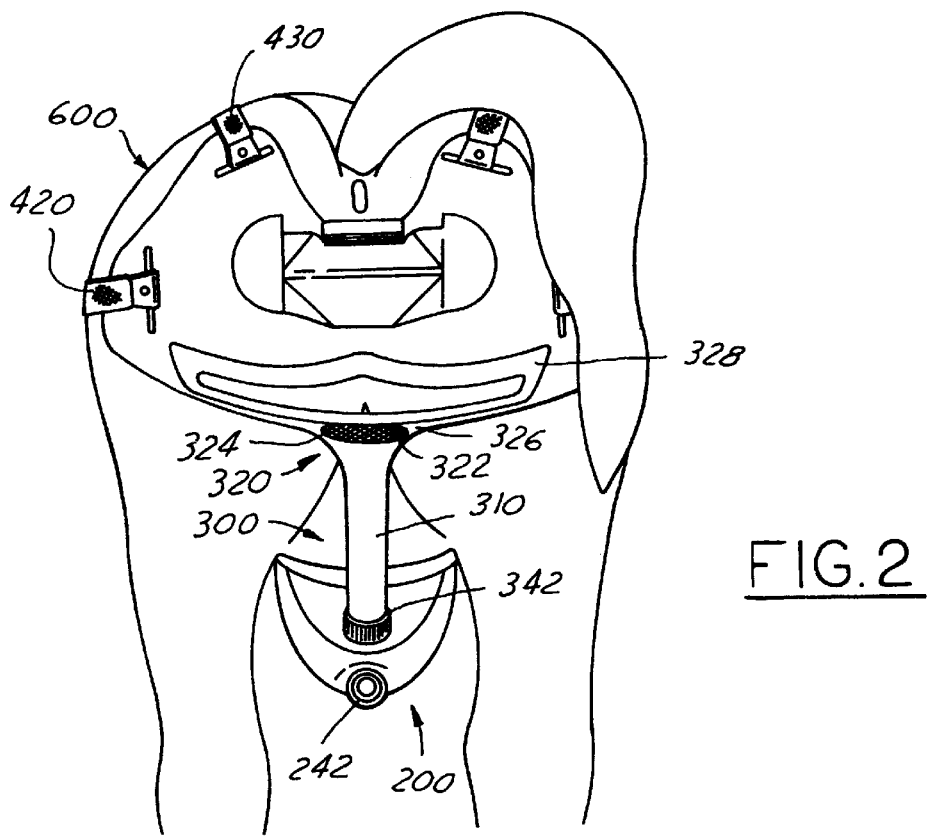
FIG. 2 is a drawing representing a rear view the mare fitted with collection device of FIG. 1.
Figure 3:
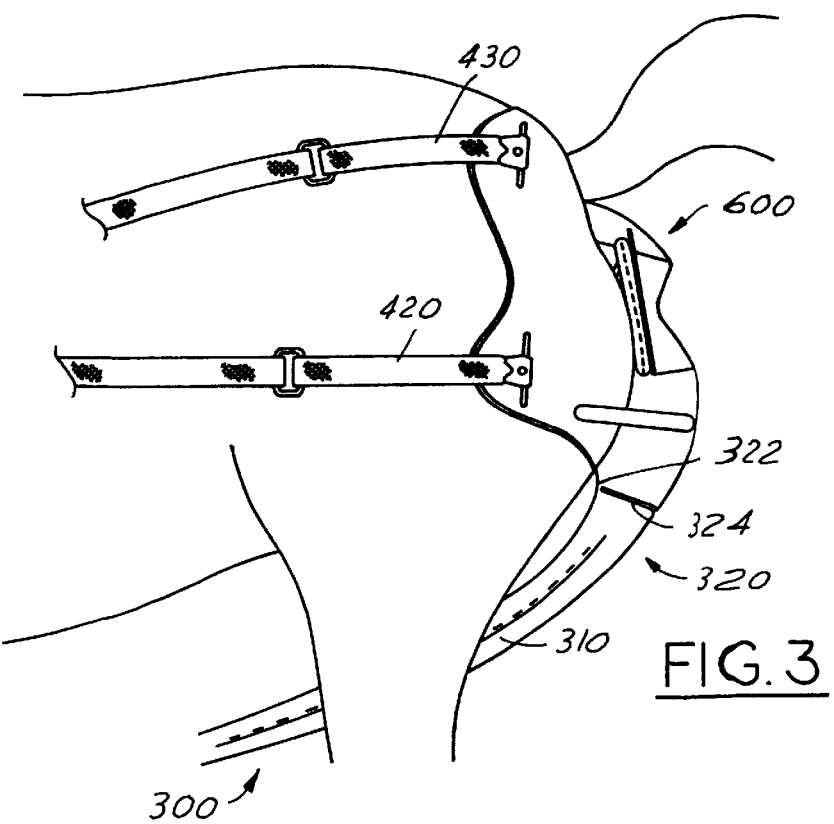
FIG. 3 is a side view corresponding with FIG. 2.

An embodiment of the invention is described in the context of the collection of urine from pregnant mares. FIGS. 1 to 3 show a collection device 100 constructed in accordance with an embodiment of the present invention when fitted to a mare. In these drawings, the collection device 100 is fitted to the mare with the assistance of a harness or strap assembly 400, and an apparatus and associated components, designated with reference numeral 600, are used for suitably locating an end of the collection device for the receipt of urine from the mare. The apparatus 600 generally separates urine and faeces produced by the mare, and primarily presents only urine to the collection device. The operation of these other components which are used in conjunction with the collection device 10 for the harvesting of urine from the mare are described in further detail below.

The apparatus 600 is positioned against the rear of the mare so that a buttocks portion of it rests against the vulva of the mare. The apparatus 600 is able, with relative efficiency, separate urine from faeces produced by the mare. Faeces is channelled over an upper portion of the apparatus 600 and simply drops to the ground or into a manure collection bag fitted to the rear of the apparatus 600. Urine is channelled to a collection aperture provided on one end of the collection device.

The collection device 100 includes a main chamber component 200 and a collection tube component 300. These two components are releasably engaged by an engagement means, the components of which are respectively disposed on the chamber component 200 and the tube component 300, as later discussed in further detail.

The tube component 300 has two ends 320, 340 connected by tubing 310. The first end 320, from which urine is initially collected, has a collection aperture 322 through which urine initially passes from the mare. Covering the collection aperture 322 is a removeable mesh filter 324 which filters material presented to the collection aperture 322. The mesh filter 324 is preferably provided to restrict the passage of any foreign matter (that is, anything other than urine) from entry into the collection tube component 300. In particular, despite the use of the apparatus 600 as mentioned above, there is a possibility that some of the mare's faeces or other matter may unintentionally pass to the collection aperture 322 of the collection tube component 300.

Faeces is a contaminant of urine collected from pregnant mares, and any faeces presented to the collection aperture 322 is desirably screened by the mesh filter 324 so that it does not enter the tube component 300. The mesh filter 324 is removable, so that it can be readily removed or replaced, either with a new mesh filter 324 or the same mesh filter 324 after cleaning. During routine cleaning operations, any residual matter on the mesh filter 324 can be removed from the mesh filter 324.

Figure 6:
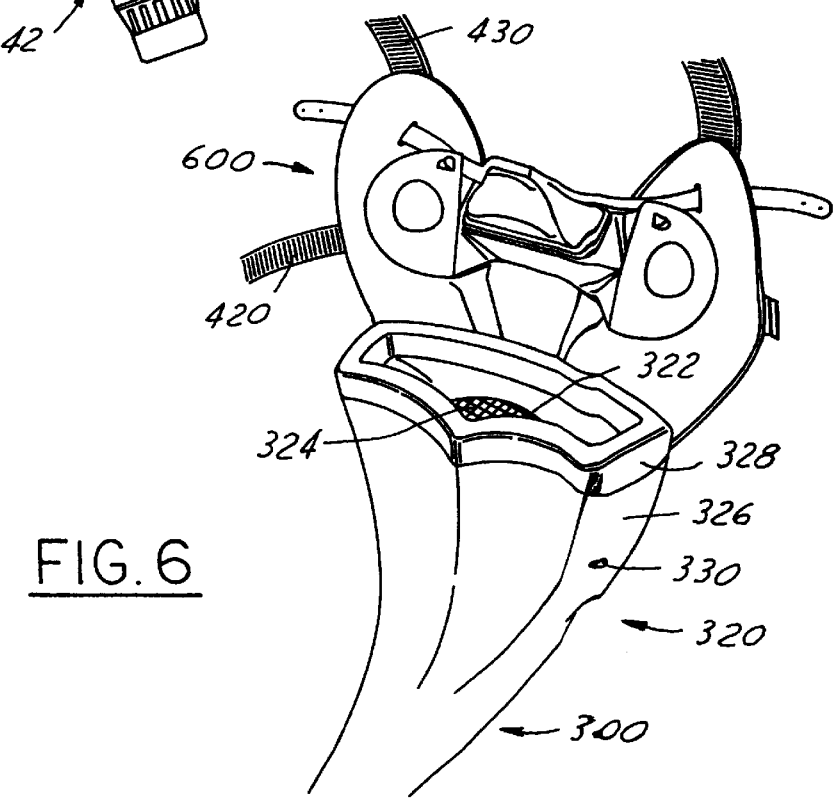
FIG. 6 is a perspective view illustrating how the collection tube is able to be positioned on the mare using an apparatus.

As indicated in FIGS. 2 and 6, the tube portion 310 is outwardly tapered toward its first end 320 to form a funnel-like arrangement material 326 extending around the collection aperture 322. This arrangement 326 assists in appropriately positioning the collection aperture 322 of the collection device 100 at the rear of the mare, and ensures that urine that falls within the scope of the funnel arrangement 326 is able to pass through the collection aperture 322 via the mesh filter 324.

Around the periphery of the funnel arrangement 326 at the first end 320 of the tube component 300 is a resilient guard member 328 which assists in ensuring the effectiveness of the funnel arrangement 326. As the tube portion 310 of the tube component is made of a soft rubber material, it is sufficiently pliable to be occluded by the mare if, for example, she backs up against a fence to thereby block the passage for urine provided by the tube portion 310.

The tube portion 310 is constructed of a soft rubber material to minimise any potential discomfort to the mare during regular use, and to minimise discomfort to the mare and her foal, should the foal find itself caught by the tube portion 310, for example, during suckling. Any such occlusion involving the tube portion 310 is likely to be only temporary, as the rubber material from which the tube portion 310 is made is sufficiently resilient to return to its nominal shape. However, any such occlusion of the passage near its first end 320 may prevent urine from being collected.

Accordingly, it is preferable that a guard member 328, as illustrated, is provided around the periphery of the funnel arrangement 326 to reduce the likelihood of any such loss. The guard member 328 is also made of a flexible resilient rubber material, though it is relatively thick and deforms more gradually in response to external pressures. One side of the guard member 328 conforms to the rear of the mare, while the other side conforms to the apparatus 600 as indicated. As a result, if the mare backs up to a fence, the action of the mare pressing against the apparatus, is less likely to cause the tube portion 310 to be occluded as the guard member 328 assists in resisting deformation of the funnel arrangement 326, to some extent.

Provided in the funnel arrangement 326 below the guard member 328 and preferably also below the mesh filter 324 and aperture 322 is a passage 330 through the material of the funnel arrangement 326 which allows excess urine to be shed, if the mare produces too much urine to be stored in the chamber component 200. Excess is temporarily stored in the tube component 300, with excess urine draining off to the ground.

The first end 320 of the tube component 300 is attached with the apparatus 600 and associated components, as shown, to appropriately position the first end 320 of the collection tube 300. The apparatus 600 is held in position by the strap assembly 400, and in particular by upper straps 430 and side straps 420 as indicated. The positioning of the tube component 300 with respect to the mare is shown, in cross-section, by FIG. 3 and assists in efficiently collecting as much urine as possible from the mare.

The first end 320 of the collection tube component 300 is attached with the tube portion 310, which is desirably elliptical or circular in cross-sectional profile, and is sufficiently pliable to permit the tube 310 to be bent to any suitable shape or orientation to accommodate the shape and movement of the mare. The tube portion 310 is desirably manufactured of a silicon or PVC welded material.

Figure 4:
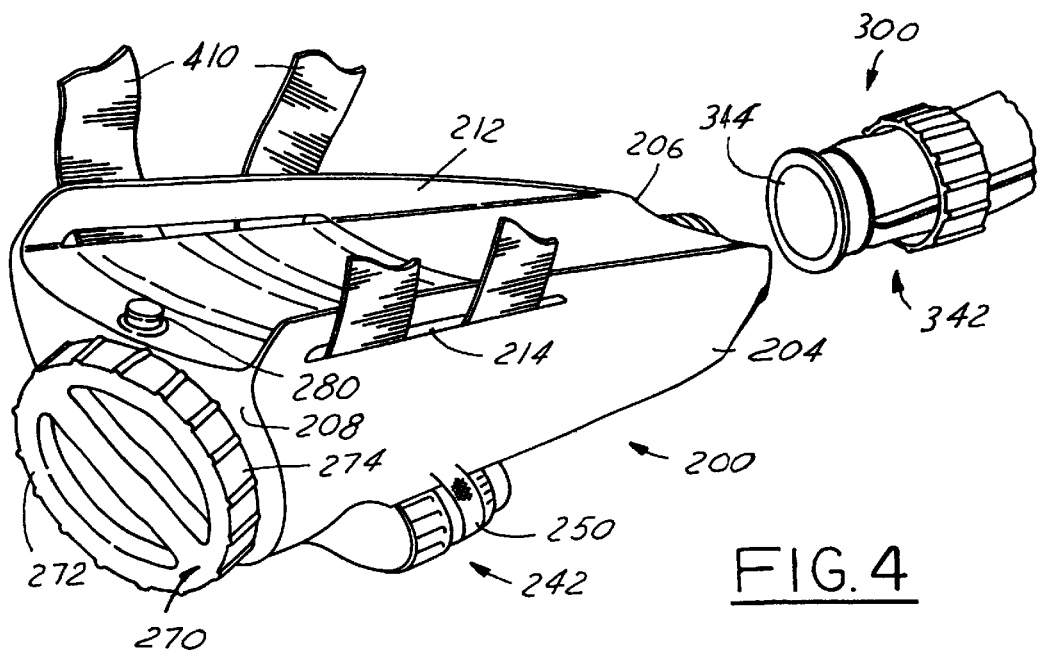
FIG. 4 is a perspective view of part of the collection device of FIG. 1.
Figure 5:
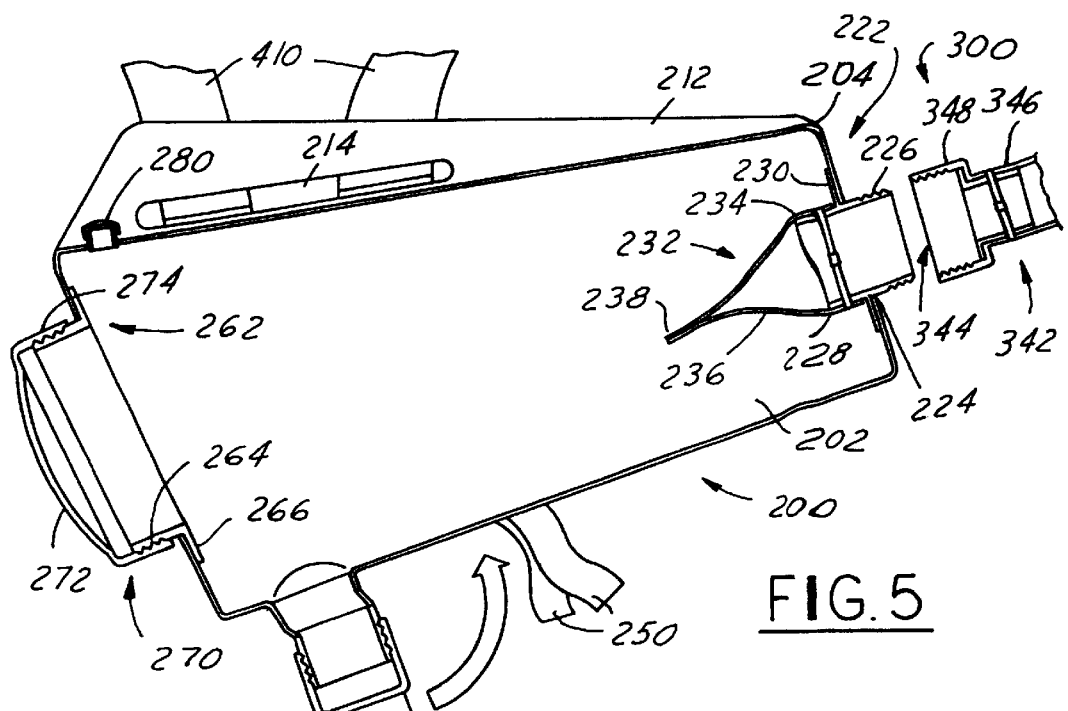
FIG. 5 is a cross-sectional view of the collection device as represented in FIG. 4.

The second end 340 of the tube component 300 distal the first end 320 is depicted in FIGS. 4 and 5. The tube component 300 includes an outlet aperture fitting 342 terminating with an outlet aperture 344. The outlet aperture fitting 342 is connected to the tube 310 by a stem portion 346 which contacts an inner surface of the tube 310. An outer portion 348 of the fitting 342 is integral with the stem portion 346 and includes a screw-threaded portion on its inner surface which is suitable for engaging a corresponding portion on the main chamber component 200. Alternatively, a self-locking portion can be used.

The main chamber component 200 is also depicted in FIGS. 4 and 5. The chamber component 200 has a shell 204, shaped as shown in the drawings, which defines an interior chamber 202 for storing urine. The shape of the chamber component 200, and the shell 204 in particular, is shown most clearly in FIG. 2. The shell 204 has an upper surface 206 which is slightly concave in profile. At the rear of the shell 204 there is a rear wall 206, and at the front a front wall 208. The upper surface 206, and the front and rear walls 206, 208 are joined by a lower surface 210 which is curved so that it extends between the two sides of the chamber component 200.

The shell 204 has a shape which outwardly tapers from the rear wall 206 to the front wall 208. The size of the rear wall 206 is less than that of the front wall 208, and the lower surface 210 of the shell 204 is shaped to accommodate this taper between the front and the rear of the shell 204.

Along upper longitudinal sides of the chamber component 200, where the lower surface 210 respectively joins the upper surface 206, there are flexible flanges 212 integral with the shell 204 that project from the longitudinal sides of the upper surface 206 generally flush with the adjoining portions of the lower surface 210, as depicted in FIG. 2. Along part of these flanges 212 are longitudinal slots 214 that are able to accommodate straps 410 for suspending the chamber component 200. The shell 204 of the chamber component 200 has various openings, each of which is described in turn below.

In the main chamber component 200, an entry aperture fitting 222, which defines an entry aperture 220, is positioned at the rear of the chamber component 200. The entry aperture fitting 222 includes a cylindrical surface 224 which extends through the entry 200 aperture in the chamber component 200, and has a screw-threaded portion 226 at an outer end, and a neck 228 at the inner end for attachment with a one-way valve fitting 232. The entry aperture fitting 222 is attached to the inner surface of the shell 204 of the chamber component 200 by a peripheral flange 230 that extends from the cylindrical surface 224 of the entry aperture fitting 222 between the screw-threaded portion 226 and the neck 228.

The base 234 of the one-way valve fitting 232 is disposed around the outer surface of the neck 228 of the entry aperture fitting 222. The sidewalls 236 of the valve fitting 232 taper to a nib 238 through which urine supplied through the entry aperture fitting 222 can pass. The sidewalls 236 of the valve fitting 232 are made of a resilient material so that a slight positive fluid pressure is required to open the nib 238 through which fluid can subsequently pass. Urine that is stored in the main chamber is generally unable to pass back through the valve fitting 232, as positive fluid pressure on this side of the fitting 232 is unable to prise open the nib 238 to allow urine to pass back through the valve fitting 232.

The chamber component 200 also includes an exit aperture 240 defined by an exit aperture fitting 242. From the shell 204 of the chamber component 200 there projects a peripheral flange 244 which terminates in a screw-threaded portion 246 which is able to engage a corresponding screw-threaded portion 248 of the exit aperture fitting 242. The exit fitting 242 can be interconnected with industrial suction equipment (not shown) to evacuate urine stored in the chamber 202.

The exit aperture fitting is able to swivel between a directly downwardly projecting position, indicated in FIG. 5, and a regular position against the lower surface 210 of the shell 204, indicated in FIGS. 1, 2 and 4. Two retaining straps 250 are provided for the purpose of retaining the exit aperture fitting 242 in its regular position against the shell 204. Respective facing surfaces of the straps 250 use looped and hooked material to allow the straps 250 to releasably engage with each other, and thus retain the fitting 242 as required. When the main chamber component 200 is fitted to the mare, the exit aperture fitting 242 with typically be in its regular position. It is extended to its directly projecting position to enable urine to be removed through the exit aperture fitting 242.

At the front of the chamber component 200, distal the entry aperture, there is an access aperture 260 defined by a access fitting 262 including a matching base 264 and lid 270. The base 264 includes an annular support 266 which is attached to the inner surface of the shell 204 surrounding the access aperture 260. Projecting through the access aperture 260 is a screw-threaded portion 268 with which the lid 270 is able to engage. The lid 270 has a cover portion 272 integral with a screw-threaded portion 274 which matches that of the access fitting 262, allowing the lid 270 to be screwed onto the access fitting 262. The access aperture 260 is relatively large, and is intended to allow manual access to the chamber 202 for various purposes such as hand cleaning, for example, with a scrubbing brush or other suitable tool. The access aperture 260 also allows for visual inspection of the contents of the chamber 202.

Provided on an upper surface of the chamber component 200 is a vent aperture 280 which is a relatively small aperture intended to facilitate the flow of urine in and out of the chamber 202 by providing an outlet and inlet for gas to balance gas pressures within the chamber 202. This is desirable, due to the use of the one-way valve fitting 232 to provide urine to the chamber 202, and the regular use of suction equipment to rapidly evacuate urine stored in the chamber 202.

The vent aperture 280 is preferably able to be sealed so that the chamber component 200 can be used to store and transport urine in the chamber component 200 once it has been harvested from the mare.

The described embodiment has various advantages not provided by existing collection devices. In particular, the use of a tubular passage that allows urine from the rear of the mare to the main chamber component provides a far less cumbersome and intrusive arrangement than is provided by existing "diaper" collection devices. For example, the use of diaper-like and similar collection devices generally prevents the mare's foal from suckling from the mare. However, the use of a tubular passage allows a foal relatively unobstructed access to the mare's teat so that the foal can suckle from the mare.

Further, the use of a storage chamber also provides advantages when compared with prior art arrangements. The storage chamber is of relatively low volume, for example, around 4 liters, compared with existing diaper devices which may have a capacity of 10 liters or more. The storage chamber stores only urine, rather than a slurry of faeces and urine which is the case when a diaper is used. Accordingly, the weight of the storage chamber when full is significantly less compared with a corresponding diaper device when filled to capacity.

Also, the storage chamber is preferably able to be readily disengaged from the tubular passage, allowing successive storage chambers to be replaced as required, after they have each been filed with urine from the mare. This does not require that the entire collection device be replaced at regular intervals, as with the prior art diapers.

In particular, it is recognised that mares predominantly urinate during the evenings and overnight, and relatively little during the day. Accordingly, the storage chamber can be fitted overnight to collect urine, and removed in the morning filled with the nightly harvest. As there may be relatively little urine output during the day, even greater comfort and freedom can be accorded the mare during the day by not fitting the storage chamber. By contrast, the prior art diapers do not permit convenient regular replacement at such frequent intervals.

As noted above, the storage chamber alone can be conveniently removed from the mare to reduce the weight carried by the mare. Performing this step minimises the risk that the mare will be inclined to kick or otherwise adversely react to a handler. If instead the entire collection device was to be removed at one time, the risk of injury to the handler increases as the handler is required to remove the collection device while standing near the rear of the horse, where the handler can be more readily kicked by the mare.

The storage chamber is desirably manufactured from a hard plastics material that permits the storage chamber, once it is filled with urine, to be disengaged from the tubular passage and removed from the mare. The storage chamber can also desirably be used to transport the urine while it is stored in the storage chamber. Alternatively, industrial suction equipment can be attached to an exit aperture on the storage chamber to facilitate convenient removal of urine from the storage chamber, at appropriate intervals.

The collection device referred to herein is intended to be used for the harvesting of urine from pregnant mares. However, embodiments can be provided which are more particularly suitable for the collection of urine from other animals, whether pregnant or not.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A collection device suitable for use in collecting urine from animals, the device including:

a collection tube component for collecting urine from an animal;

a main chamber component for storing urine collected with said collection tube component; and engagement means for operatively connecting said collection tube component and said main chamber component so that said collection tube component and said main chamber component are both releasably engageable;

wherein, in use, the collection device is positioned to collect urine from an animal, said engagement means is able to operatively connect said main chamber component and said collection tube component for allowing urine to pass from said collection tube component to said main chamber component and a one-way valve that prevents the collected urine from exiting said main chamber component.

2. A collection device according to claim 1, wherein said engagement means includes corresponding engagable portions respectively disposed on said main chamber component and said collection tube component for connecting these components.

3. A collection device according to claim 2, wherein said engageable portions are screw-threaded or self-locking.

4. A collection device according to claim 1, wherein the main chamber component includes one or more attachment means by which the main chamber component can be suspended from the animal by means of an external support means.

5. A collection device according to claim 4, wherein the attachment means includes two flanges projecting from the main chamber component along a major dimension of the main chamber component, and longitudinal slots extending at least partly along said flanges.

6. A collection device according to claim 5, wherein support means in the form of supports straps are threaded through said longitudinal slots to suspend the main chamber component under the belly of the animal.

7. A collection device according to claim 6, wherein the length of said longitudinal slots is greater than the width of the straps by which the chamber is suspended, whereby the position of the main chamber can be adjusted as required.

8. A collection device according to claim 1, wherein said main chamber component has a generally longitudinal shape having a major dimension.

9. A collection device according to claim 8, wherein said main chamber component is slightly tapered in its major dimension.

10. A collection device according to claim 1, wherein the said main chamber component is made from a material which is selected from the group comprising PVC, silicon and gum rubber and is sufficiently robust to be generally suitable for regular handling.

11. A collection device according to claim 1, wherein said main chamber component is adapted to be sealed while the urine is still stored within said main chamber component, for subsequent transport of the urine while it remains in said main chamber component.

12. A collection device according to claim 1, wherein the capacity of said main chamber component is greater than the volume of daily urine output of the animal with which the collection device is intended to be used.

13. A collection device according to claim 1, wherein once the capacity of said main chamber component is exhausted, further urine is shed using a overflow mechanism on said main chamber component or on the collection tube component.

14. A collection device according to claim 1, wherein said main chamber component includes an exit valve through which urine can be drained from said collection tube device, once urine has been collected in said main chamber.

15. A collection device according to claim 14, wherein said exit valve can be operated by hand to release urine stored in said main chamber component.

16. A collection device according to claim 14, wherein said exit valve is snap engagable by an evacuation device which is adapted to remove urine from said main chamber component using suction pressure.

17. A collection device according to claim 1, wherein said main chamber component includes an access aperture though which manual access can be gained to the inner surfaces of said main chamber.

18. A collection device according to claim 14, wherein said access aperture is adapted to be covered with a removable cover member.

19. A method of using a collection device having a main chamber component which is interengagable with a collection tube component, the method including:
   fitting the collection device to an animal from which urine is to be collected using the collection device;
   disengaging the main chamber component from the collection tube component when urine has been collected in the main chamber component, and removing the main chamber component from the animal; and
   engaging a replacement main chamber component with the collection tube component for subsequent collection of urine from the animal.

20. A method according to claim 19, wherein step of fitting the collection device includes threading support means in the form of support straps through longitudinal slots provided in the main chamber component, so that the main chamber component is suspended under the belly of the mate.

21. A collection device according to claim 19 or 20, wherein, prior to disengaging the main chamber component from the collection tube component, the main chamber component is sealed while the urine is still stored within the main chamber component, for subsequent transport of the urine while it remains in the main chamber component.

22. A collection device suitable for use in collecting urine from animals, the device including:
   a collection tube component for collecting urine from an animal;
   a main chamber component for storing urine collected with said collection tube component;
   engagement means for operatively connecting said collection tube component and said main chamber component so that said collection tube component and said main chamber component are both releasably engagable; and
   at least one attachment member and external support member for suspending said main chamber component from an animal;
   wherein, in use, said collection device is positioned to collect urine from an animal, and said engagement means is able to operatively connect said main chamber component and said collection tube component for allowing urine to pass from said collection tube component to said main chamber component.

23. A collection device according to claim 22, wherein said engagement means includes corresponding engagable portions respectively disposed on said main chamber component and said collection tube component for connecting these components.

24. A collection device according to claim 23, wherein said engageable portions are screw-threaded or self-locking.

25. A collection device according to claim 23, wherein disposed adjacent said engagable portion of said engagement means is a one-way valve which ensures urine entering said main chamber component is unable to exit said main chamber component.

26. A collection device according to claim 23, wherein said attachment means includes two flanges projecting from said main chamber component along a major dimension of said main chamber component, and longitudinal slots extending at least partly along said flanges.

27. A collection device according to claim 26, wherein support means in the form of support straps are threaded through said longitudinal slots to suitably suspend said main chamber component under the belly of the animal.

28. A collection device according to claim 27, wherein the length of said longitudinal slots is greater than the width of said support straps by which the chamber is suspended, whereby the position of said main chamber can be adjusted as required.

29. A collection device according to claim 22, wherein said main chamber component has a generally longitudinal shape with a major dimension.

30. A collection device according to claim 29, wherein said main chamber component is slightly tapered in its major dimension.

31. A collection device according to claim 22, wherein once the capacity of said main chamber component is exhausted, further urine is shed using a overflow mechanism on said main chamber component or on said collection tube component.

32. A collection device according to claim 22, wherein said main chamber component includes an exit valve through which urine can be drained from the collection device, once it has been collected in the main chamber.

* * * * *

UNITED STATES PATENT AND TRADEMARK OFFICE
CERTIFICATE OF CORRECTION

PATENT NO.    : 6,709,409 B2
DATED         : March 23, 2004
INVENTOR(S)   : Daira Valda Vella It is certified that error appears in the above-identified patent and that said Letters Patent is hereby corrected as shown below:

Column 8,
Line 4, delete "and"
Line 9, insert -- and --
Line 49, delete "the"

Column 9,
Line 36, delete "mate" and insert -- animal --

Signed and Sealed this

Tenth Day of August, 2004

JON W. DUDAS
*Acting Director of the United States Patent and Trademark Office*